United States Patent
White et al.

(10) Patent No.: US 9,935,767 B2
(45) Date of Patent: Apr. 3, 2018

(54) SECURE STORAGE

(71) Applicant: BlackBerry Limited, Waterloo (CA)

(72) Inventors: Johnathan George White, London (GB); SeungSub Jung, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 97 days.

(21) Appl. No.: 14/965,748

(22) Filed: Dec. 10, 2015

(65) Prior Publication Data

US 2016/0173281 A1 Jun. 16, 2016

Related U.S. Application Data

(60) Provisional application No. 62/091,909, filed on Dec. 15, 2014, provisional application No. 62/101,772, filed on Jan. 9, 2015.

(51) Int. Cl.
*H04L 9/00* (2006.01)
*H04L 9/08* (2006.01)
(Continued)

(52) U.S. Cl.
CPC ........ *H04L 9/0844* (2013.01); *G06F 12/1408* (2013.01); *G06F 21/6218* (2013.01);
(Continued)

(58) Field of Classification Search
CPC .. G06F 12/1408; G06F 21/6218; G06F 21/78; G06F 2212/1052; G06F 2221/2129;
(Continued)

(56) References Cited

U.S. PATENT DOCUMENTS 7,926,095 B1 * 4/2011 Weiner ................. H04L 9/0891
  713/168
8,554,176 B2 * 10/2013 McLean ................ G06F 21/602
  455/410

(Continued)

FOREIGN PATENT DOCUMENTS

WO    2014014879 A2    1/2014

OTHER PUBLICATIONS

"How security technology and data protection are implemented within Apple Watch," anonymous author, May 19, 2015, <http://www.idownloadblog.com/2015/05/19/apple-watch-security/>.

(Continued)

*Primary Examiner* — Sayed Beheshti Shirazi
(74) *Attorney, Agent, or Firm* — Fish & Richardson P.C.

(57) ABSTRACT

Methods, systems and computer readable media for configuring secure storage on a computing device. A method comprises: storing, at a first application running on a first computing device, authentication data associated with an authenticated communications session conducted between the first application and a second application running on a second computing device different from the first computing device; receiving, at the first application, an activation command comprising encryption data from the second application; authenticating, by the first application, the activation command based on the stored authentication data; and configuring, by the first application, secure storage on the first device based at least in part on the activation command received from the second application, wherein configuring the secure storage comprises encrypting application data associated with execution of the first application based on the encryption data.

18 Claims, 11 Drawing Sheets

(51) Int. Cl.
  *G06F 12/14* (2006.01)
  *G06F 21/62* (2013.01)
  *G06F 21/78* (2013.01)
  *H04L 29/06* (2006.01)
(52) U.S. Cl.
  CPC ...... *G06F 21/78* (2013.01); *G06F 2212/1052* (2013.01); *G06F 2221/2129* (2013.01); *G06F 2221/2137* (2013.01); *H04L 63/062* (2013.01)
(58) Field of Classification Search
  CPC ........... G06F 2221/2137; H04L 63/062; H04L 9/0844
  See application file for complete search history.

(56) References Cited

U.S. PATENT DOCUMENTS

| | | | |
|---|---|---|---|
| 2003/0159072 A1* | 8/2003 | Bellinger | H04L 63/0272 726/8 |
| 2008/0175379 A1* | 7/2008 | Hansen | H04L 63/061 380/44 |
| 2009/0075630 A1* | 3/2009 | McLean | G06F 21/602 455/411 |
| 2010/0293598 A1* | 11/2010 | Collart | G06F 17/30056 726/3 |
| 2012/0284786 A1* | 11/2012 | Somani | H04L 63/0815 726/7 |
| 2012/0304200 A1* | 11/2012 | Oliver | G06F 9/4843 719/319 |
| 2013/0145160 A1* | 6/2013 | Bursell | G06F 21/6218 713/168 |
| 2013/0227279 A1* | 8/2013 | Quinlan | H04L 63/0428 713/165 |
| 2013/0227280 A1* | 8/2013 | Quinlan | H04L 9/0822 713/165 |
| 2013/0227287 A1* | 8/2013 | Quinlan | H04L 67/025 713/168 |
| 2014/0032904 A1* | 1/2014 | Margalit | H04L 63/0428 713/168 |
| 2016/0086176 A1* | 3/2016 | Silva Pinto | G06Q 20/401 705/44 |
| 2016/0127900 A1* | 5/2016 | John Archibald | H04W 12/06 726/7 |

OTHER PUBLICATIONS

International Search Report and Written Opinion issued in International Application No. PCT/US2015/065083 dated Jun. 23, 2016.
"How to set up the Sony Android Smartwatch" YouTube video by Android Advice & Tutorials, published May 4, 2012 (https://www.youtube.com/watch?v=z8pGJRKxvTk).
"Pebble Smartwatch Review Engadget" YouTube video by Engadget, published Feb. 1, 2013 (https://www.youtube.com/watch?v=VGzdqqkQ0IA&spfreload=10).
"The questions every CIO should be asking about Apple Watch" MobileIron—Ryan FAAS, posted Nov. 21, 2014 (https://www.mobileiron.com/en/smartwork-blog/questions-every-cio-should-be-asking-about-apple-watch?utm_source=PANTHEON_STRIPPED &utm_medium=PANTHEON_STRIPPED &utm_content=PANTHEON_STRIPPED &utm_campaign=PANTHEON_STRIPPED).
"Enterprise Wearables an $18B Market by 2019" Datamation BI Big Data Software, posted by Pedro Hernandez on May 16, 2014 (http://www.datamation.com/mobile-wireless/enterprise-wearables-an-18b-market-by-2019.html).
"Personal Privacy, Smatchwatch Security, and you", Smatchwatches.org—by Briley Kenney posted Oct. 13, 2014 (http://smartwatches.org/learn/privacy-smartwatch-security-and-you/).
"Just how secure are smart watches?", pocketnow.com by Joe Levi posted Mar. 6, 2014 (http://pocketnow.com/2014/03/06/smart-watch-security).
International Search Report and Written Opinion dated Jun. 13, 2014 issued on related PCT Application No. PCT/US2014/013457, filed Jan. 28, 2014 and published by the International Bureau as WO/2014/120691 on Aug. 7, 2014.
Written Opinion of the International Preliminary Examining Authority issued in International Application No. PCT/US2015/065083 dated Nov. 18, 2016; 7 pages.
International Preliminary Report on Patentability issued in International Application No. PCT/US2015/065083 dated Mar. 9, 2017; 8 pages.

* cited by examiner

SECURE STORAGE

CROSS-REFERENCE TO RELATED APPLICATION

This application claims the benefit of U.S. Provisional Patent Application Nos. 62/091,909, filed on Dec. 15, 2014, and 62/101,772, filed Jan. 9, 2015, the entire contents of each of which are incorporated herein by reference in their entirety.

BACKGROUND OF THE INVENTION

Embodiments of the present disclosure relate to configuration of secure storage on a computing device.

Secure platforms provide an architecture for deployment and management of secure applications running on computing devices. A secure application enables an enterprise to deploy sensitive data to the respective computing device, and to remotely manage the sensitive data in a secure manner. For example, such management may include remote deletion of the sensitive data in the event that the computing device is compromised or in the event that the user of the computing device leaves the employment of the enterprise.

At least some of the data managed by the secure application running on the mobile device is stored in encrypted format. The data may be encrypted using methods as known in the art. For example, the encryption may employ "containerization" techniques, according to which the data is encrypted and subject various access policies which are applied to control which users can access the data within the container. The access policies can for example be determined and varied if desired by a remote user, such as an administrator of an enterprise network.

An example of a secure platform which employs secure applications in this manner is the Good Dynamics™ mobile platform developed by Good Technology™ of Sunnyvale, Calif., United States.

SUMMARY

According to a first aspect, there is provided a computer-implemented method for configuring secure storage on a computing device, the method comprising: storing, at a first application running on a first computing device, authentication data associated with an authenticated communications session conducted between the first application and a second application running on a second computing device different from the first computing device; receiving, at the first application, an activation command comprising encryption data from the second application; authenticating, by the first application, the activation command based on the stored authentication data; and configuring, by the first application, secure storage on the first device based at least in part on the activation command received from the second application, wherein configuring the secure storage comprises encrypting application data associated with execution of the first application based on the encryption data. In this manner, the first application and the second application may cooperate to enable configuration of secure storage associated with the first application, based on the authenticated communications session established between the first application and the second application. In some situations the second application is authenticated and trusted by a remote management server and the authenticated communication session enables this trust to be extended from the second application to the first application. This extension of trust may be advantageous in situations where the first application is itself unable to establish an authenticated communications session with the remote management server, or it is undesirable for the first application to establish a communications session with the remote server (e.g. for security reasons or power saving purposes).

In some embodiments, the computer-implemented method comprises generating, by the first application, an encryption key based on the encryption data, wherein encryption of the application data is based on the encryption key.

In some embodiments, the activation command further includes policy data indicative of one or more data access policies associated with the application data. The policy data received form the second application controls how the first application may access and use the application data stored in the secure storage. Accordingly, in some embodiments, the computer-implemented method comprises the first application controlling access to the encrypted application data based on the one or more data access policies indicated by the policy data.

In some embodiments, the policy data is generated at a management server remote from the first application and the second application. In some embodiments, the policies defined by the policy data may be set by an administrator of the management server.

In some embodiments, configuring the secure storage comprises encrypting the policy data based on the encryption data. This ensures that the policy data cannot be modified by a malicious application or process when the first application is not running or is in a locked state.

In some embodiments, the authentication data is generated in a secure pairing process initiated between the first application and the second application. In some embodiments, the secure pairing process is based on a Diffie-Hellman key exchange. In some embodiments, the secure pairing process is based on the Simple Secure Pairing algorithm. This secure pairing process enables the first application and the second application to establish mutual trust which is leveraged to authenticate subsequent communications between the first and second applications. For example, the secure pairing process may require the user of the first and second devices to verify that a pair of numeric or alphanumeric codes displayed by the first and second computing devices are a match. Alternatively, the pairing process may be based on the comparison of a pair of images displayed by the first and second computing devices, or an audio clip emitted by first and second computing devices. Further pairing mechanisms may be based on an out-of-band exchange of a passkey or similar, which may be facilitated manually by the user or via a different means of communication to that used to establish the authenticated communications session. The nature of the pairing process may be tailored according to the functional capabilities of the first and second computing devices (e.g. user interface and/or connectivity).

In some embodiments, the pairing process is performed via a communications link established between the first computing device and the second computing device. In some embodiments, at least part of the communications link comprises a wireless communications link.

In some embodiments, the authentication data is indicative of a cryptographic key shared between the first application and the second application.

In some embodiments, the computer-implemented method comprises sending, by the first application, an unlock request based on the authentication data; receiving, at the first application, an unlock command comprising decryption data from the second application; authenticating, at the first application, the unlock data based on the authentication data; and decrypting, at the first application, the application data based on the decryption data received from the second application.

In some embodiments, the computer-implemented method comprises generating a decryption key based on the decryption data, wherein decryption of the application data is based on the decryption key.

In some embodiments, the first application is configured to disable functionality associated with the first application and the computer-implemented method comprises enabling the disabled functionality in response to configuring the secure storage on the first computing device. In this manner, the user of the first computing device can be prevented from accessing the disabled functionality until the first application has been activated by the second application and suitable secure storage has been provisioned for the storage of application and/or policy data.

In some embodiments, enabling the disabled functionality comprises verifying an activation key received from the second application. According to these embodiments, the first application may be pre-configured with means to verify the activation key using, for example, an appropriate hash algorithm or hash-based message authentication algorithm.

In some embodiments, enabling the disabled functionality comprises verifying the presence of the secure storage on the first computing device. This ensures that the disabled functionality is not enabled until suitable secure storage has been configured for storage of application and/or policy data.

In some embodiments, the disabled functionality includes a user interface associated with the first application. In other embodiments, the disabled functionality includes access from the first application to network connectivity provide by the first computing device. The extent to which functionality associated with the first application is disabled may be tailored by an administrator to meet the requirements of an associated enterprise.

In some embodiments, the decryption data is the same as the encryption data.

According to a second aspect, there is provided a computer-implemented method for configuring secure storage on a computing device, the method comprising: storing, at a first application running on a first computing device, authentication data associated with an authenticated communications session initiated between the first application and a second application running on a second computing device different from the first computing device; receiving, from a remote server, policy data indicative of one or more data access policies associated with application data stored by the second application; generating, at the first application, encryption data for the second application in response to receipt of an activation request from the second application; generating, at the first application, an activation command comprising the encryption data and the policy data; signing, by the first application, the activation command using the authentication data; and sending the activation command from the first application to the second application, wherein the activation is configured to activate secure storage associated with the second application.

According to a third aspect, there is provided a non-transitory computer-readable storage medium comprising computer-executable instructions which, when executed by a processor, cause a computing device to perform a method of configuring secure storage on a computing device, the method comprising: storing, at a first application running on a first computing device, authentication data associated with an authenticated communications session conducted between the first application and a second application running on a second computing device different from the first computing device; receiving, at the first application, an activation command comprising encryption data from the second application; authenticating, by the first application, the activation command based on the stored authentication data; and configuring, by the first application, secure storage on the first device based at least in part on the activation command received from the second application, wherein configuring the secure storage comprises encrypting application data associated with execution of the first application based on the encryption data.

According to a fourth aspect, there is provided a non-transitory computer-readable storage medium comprising computer-executable instructions which, when executed by a processor, cause a computing device to perform a method of configuring secure storage on a computing device, the method comprising: storing, at a first application running on a first computing device, authentication data associated with an authenticated communications session initiated between the first application and a second application running on a second computing device different from the first computing device; receiving, from a remote server, policy data indicative of one or more data access policies associated with application data stored by the second application; generating, at the first application, encryption data for the second application in response to receipt of an activation request from the second application; generating, at the first application, an activation command comprising the encryption data and the policy data; signing, by the first application, the activation command using the authentication data; and sending the activation command from the first application to the second application, wherein the activation is configured to activate secure storage associated with the second application.

The aspects and embodiments described above may be employed in the context of a primary computing device and a secondary computing device which are in communication with each other. In this regard, the "first application" may refer to a "secondary application" running on the secondary computing device, whereas the "second application" may refer to a "primary application" running on the secondary computing device. In a typical example, the primary computing device may be a smartphone and the secondary computing device may be a wearable device in communication with the smartphone.

BRIEF DESCRIPTION OF THE DRAWINGS

Further features of this disclosure will become apparent from the following description of preferred embodiments, given by way of example only, which is made with reference to the accompanying drawings, of which.

DETAILED DESCRIPTION OF CERTAIN INVENTIVE EMBODIMENTS

Figure 1A:
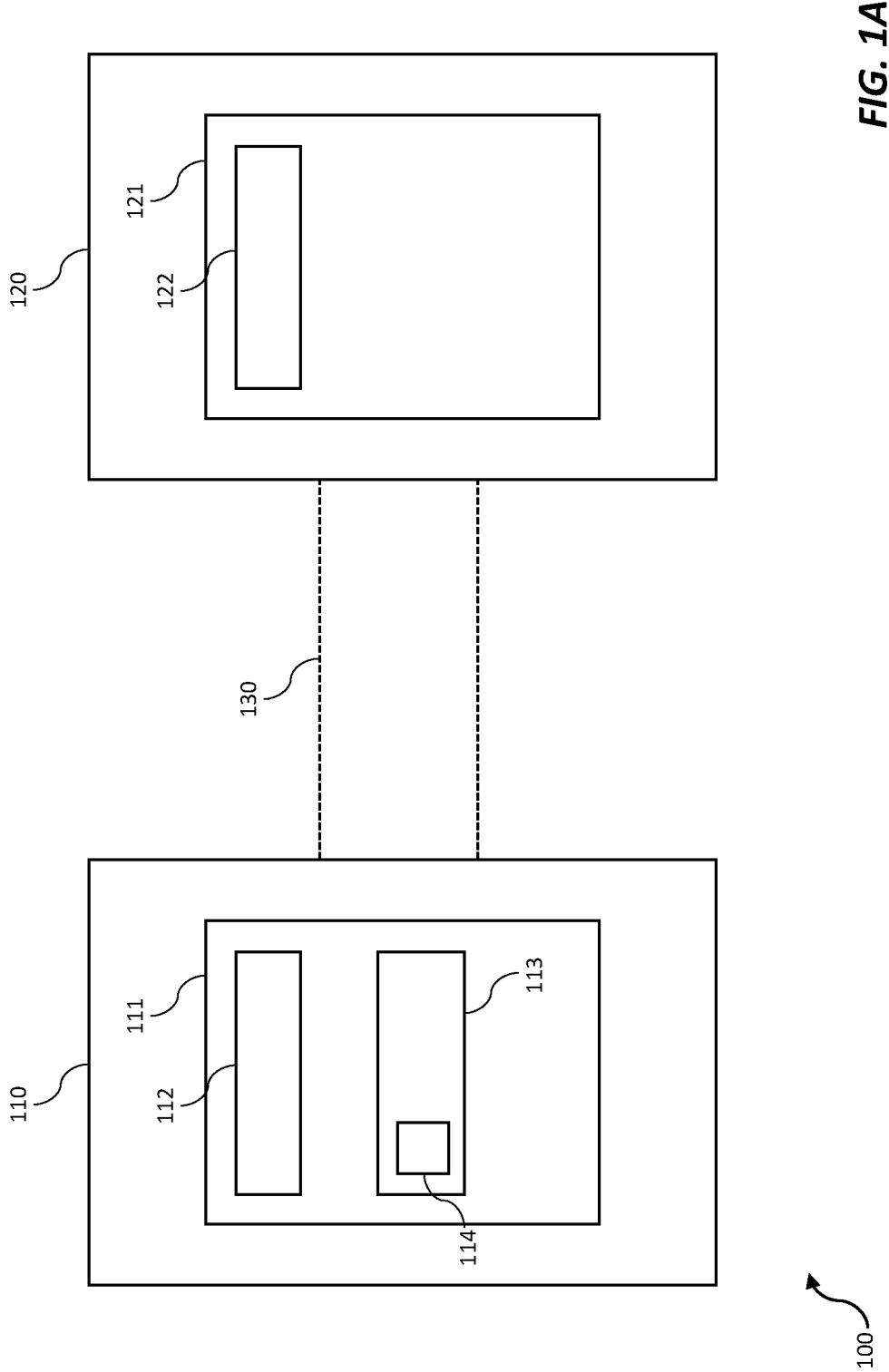
FIGS. 1A to 1G are schematic diagrams showing a plurality of states associated with a primary application and a secondary application in accordance with an embodiment.

FIG. 1A is a schematic diagram which shows a system 100 including a first computing device 110 (hereinafter termed a "primary computing device") and a second computing device 120 (hereinafter termed a "secondary computing device") in an initial state, in accordance with an embodiment. The primary computing device 110 is configured with a first application 111 (hereinafter termed a "primary application") and the secondary computing device 120 is configured with a second application 121 (hereinafter termed a "secondary application"). The primary computing device 110 and the secondary computing device 120 are communicatively coupled or "tethered" to each other via a communications link 130, such as a Bluetooth™ communications link, or a Near Field Communications (NFC) communications link. In further embodiments, communications link may carried over a wireless local area network (WLAN) or a cellular network based on Global System for Mobile Communications (GSM), Universal Mobile Telecommunications System (UMTS), Code Division Multiple Access (CDMA), Long Term Evolution (LTE), or the like.

In a typical embodiment, the primary computing device 110 is a smartphone or laptop, and as such is equipped with a user interface allowing a user to interact with the primary application 111, and appropriate network functionality to enable the primary computing device 110 to connect to one or more remote servers for activation and management of the primary application 111. For example, the primary application 111 may be activated and managed by one or more remote management servers, located in a Network Operations Center (NOC) and/or an enterprise network. In this context, the primary application 111 and the one or more remote management servers may establish mutual trust on the basis of a Public Key Infrastructure (PKI) or any other appropriate technology. In some embodiments, installation of the primary application 111 on the primary computing device 110 may be facilitated by a catalog server located in the NOC or the enterprise network. According to further embodiments, installation of the primary application 111 may be facilitated by a digital distribution platform, such as the App Store™ provided by Apple Inc. of Cupertino, Calif., United States, or Google Play™ provided by Google Inc. of Mountain View, Calif., United States.

The secondary computing device 120 may be a wearable device, such as a smartwatch or an activity tracker, and as such may have the same or different user interface capabilities. Further, the secondary computing device may have different communication capabilities to those of the primary computing device; for example it may be relatively limited in terms of network connectivity and thus unable to communicate with the one or more remote management servers discussed above in relation to the primary application 111. In a similar manner to that described above in relation to the primary application 121, installation of the secondary application 121 on the secondary computing device 120 may be facilitated by a catalog server located in the NOC or the enterprise network. Similarly, installation of the primary application 111 may also be facilitated by a digital distribution platform, such as the App Store™ or Google Play™ as discussed above.

The primary application 111 includes a runtime process 112 which runs in volatile memory (not shown) associated with the primary computing device 110 and provides runtime functionality for the application, such as user interface functionality and cryptographic functionality. The primary application 111 also includes a secure container 113 which comprises application data (not shown) which is stored in non-volatile memory (not shown) associated with the primary computing device 110 in encrypted form to prevent unauthorized access. In the present embodiment, the application data stored in the in secure container 113 includes one or more files and/or databases which may be accessed by the runtime process 112 during execution of the primary application 111. Thus, the secure container 113 represents an area of secure storage configured in non-volatile memory associated with the primary computing device 110 and managed by the primary application 111.

In the present context, the secure container 113 associated with the primary application 111 may adopt a plurality of states, including a locked state and an unlocked state. When in the locked state, the application data stored in the container 113 is encrypted and cannot be accessed by the associated runtime process 112, or indeed any other process executing on the primary computing device 110. Conversely, when the container 113 is in an unlocked state, the application data stored in the container 113 is decrypted (i.e. plaintext) and can be accessed by the runtime process 112. Typically, encryption and decryption of the container 113 is performed by the runtime process 112 using a cryptographic key (hereinafter termed a "primary container key") which is derived from an application secret associated with the primary application (hereinafter terms a "primary application secret"), such as a password or passcode, which is input via a user interface associated with the primary application 111 by a user of the primary computing device 110. The primary container key may, for example, be derived from the primary application secret using a cryptographic hash algorithm or a hash based message authentication code (HMAC) such as the HMAC-SHA512 algorithm. In the embodiment shown in FIG. 1A, the container 113 associated with the primary application 111 is in a locked state, as denoted by a solid line.

The secure container 113 of the primary application 111 is associated with policy data 114 which defines various access policies associated with the container. For example, the policy data 114 may define a policy which specifies an inactivity timeout period, on expiry of which the container 113 should be locked to prevent further access to the application data. Further policies may control how the application stored in the container 113 may be used by the runtime process 112 to, for example, prevent the application data from being copied to other applications running on the primary computing device 110 or the secondary computing device 120. The policy data 114 may further define policies associated with the secondary application 121 and also the extent to which the primary application 111 is allowed to interact with the secondary application 121. For example, the policy data 114 may define a policy specifying whether the primary application 111 is allowed to initiate a pairing session with the secondary application 121, as discussed in further detail below. Typically, the policies defined by the policy data 114 are set by an administrator and distributed to the primary application 111 by the one or more remote management servers discussed above.

The secondary application 121 includes a runtime process 122 which runs in volatile memory (not shown) associated with the secondary computing device 120. However, in the state shown in FIG. 1A, the secondary application 121 is in an "inactivated" or "deactivated" state and thus does not have access to a secure container. In the absence of a secure container, the secondary application 121 is unable to securely store application data (e.g. data received from the primary application 111 or data received via a user interface associated with the secondary application 121) in non-volatile memory associated with the secondary computing device 120, and thus represents a potential security risk where, for example, the primary application 111 wishes to share sensitive or confidential data with the secondary application 121. Thus, whilst the secondary application 121 remains in an inactivated or deactivated state, the trust relationship established between the primary application 111 and the one or more remote management servers cannot be extended to the secondary application 121 until the secondary application has been "activated" to provide suitable secure storage. In some embodiments, when in the inactivated state, the secondary application 121 may restrict some of all functionality associated with the secondary application 121 until the secondary application 121 has been activated by the primary application 111. Moreover, the secondary application 121 may present the user with one or more messages (e.g. via a user interface associated with the secondary application 121) informing the user that the secondary application 121 must be activated before the associated functionality can be accessed.

To facilitate activation of the secondary application 121 and a corresponding secure container for the secondary application 121, it is first necessary to establish a trust relationship between the primary application 111 and the secondary application 121, such that communications between the respective applications 111, 121 can be authenticated and encrypted when required. As discussed above, the primary computing device 110 and the secondary computing device 120 are communicatively coupled via communications link 130 which is established on the basis of a trust between the primary computing device 110 and the secondary computing device 120. This communications link 130 typically provides encryption of communications between the computing devices 110, 120 to provide basic protection against so called "man-in-the-middle" attacks by a malicious third party devices, but typically does not provide trust between individual applications running on the respective computing devices 110, 120. Thus, it is desirable to provide an additional layer of security to enable authenticated and secure communications between the primary application 111 and the secondary application 121, to thereby prevent potential interference by malicious third party applications running on the computing devices, in addition to providing an additional layer of security against man-in-the-middle attacks from a malicious third party device.

Figure 1B:
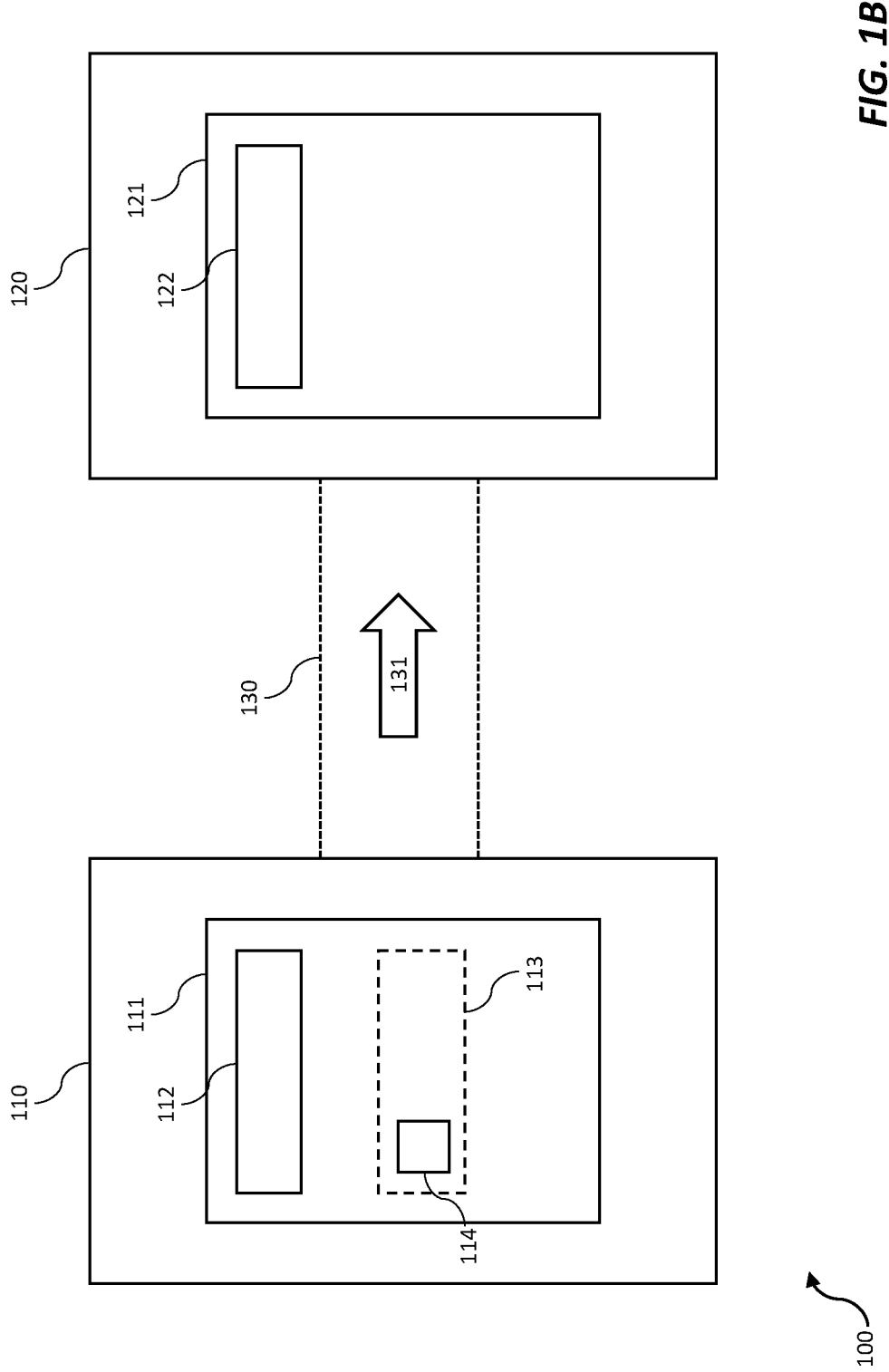

With reference to FIG. 1B, an activation process for the secondary application 121 is initiated by unlocking the primary application 111. In one example and as discussed above, the primary application 111 may be unlocked by the user inputting the primary application secret via the associated user interface. Upon receipt of the primary application secret, the runtime process 112 associated with the primary application 111 derives the primary container key (not shown) from the primary application secret using a cryptographic hash function or a hash-based message authentication code as discussed above (e.g. using the HMAC-SHA512 function or similar). The runtime process 112 uses the derived primary container key to unlock (i.e. decrypt) the associated secure container 113, as denoted by dashed line shown in FIG. 1B. Once the container 113 has been unlocked, the user may initiate an activation process for the secondary application 121 by, for example, selecting an activation option from the user interface associated with primary application 111.

As discussed above, the extent to which the primary application 111 is allowed to interact with the secondary application 121, including whether the primary application 111 is allowed to activate the secondary application 121, may be defined by one or more policies specified by the policy data 114 stored in the secure container 113. Upon initiation of the activation process, the primary application 111 searches for the secondary application 121 running on the secondary computing device 120 using, for example, a service discovery protocol provided by an operating system (not shown) running on the secondary computing device 120. Alternatively or additionally, the primary application 111 may search for the secondary application 121 running on the secondary computing device 120 using a proprietary service discovery protocol, such the service discovery protocol developed by Good Technology Corporation™ of Sunnyvale, Calif., United States of America, aspects of which are disclosed in international patent application publication WO 2014/014879 A2, the entire contents of which is incorporated herein by reference. Upon discovery of the secondary application 121, the primary application 111 sends an activation message 131 to the secondary application 121 over the communications link 130 to prompt the secondary application 121 to participate in the activation process. In further embodiments, the activation process may be initiated by launching the secondary application 121 on the secondary computing device 120, which in turn initiates a search process for the primary application 111 to participate in the activation process.

Figure 1C:
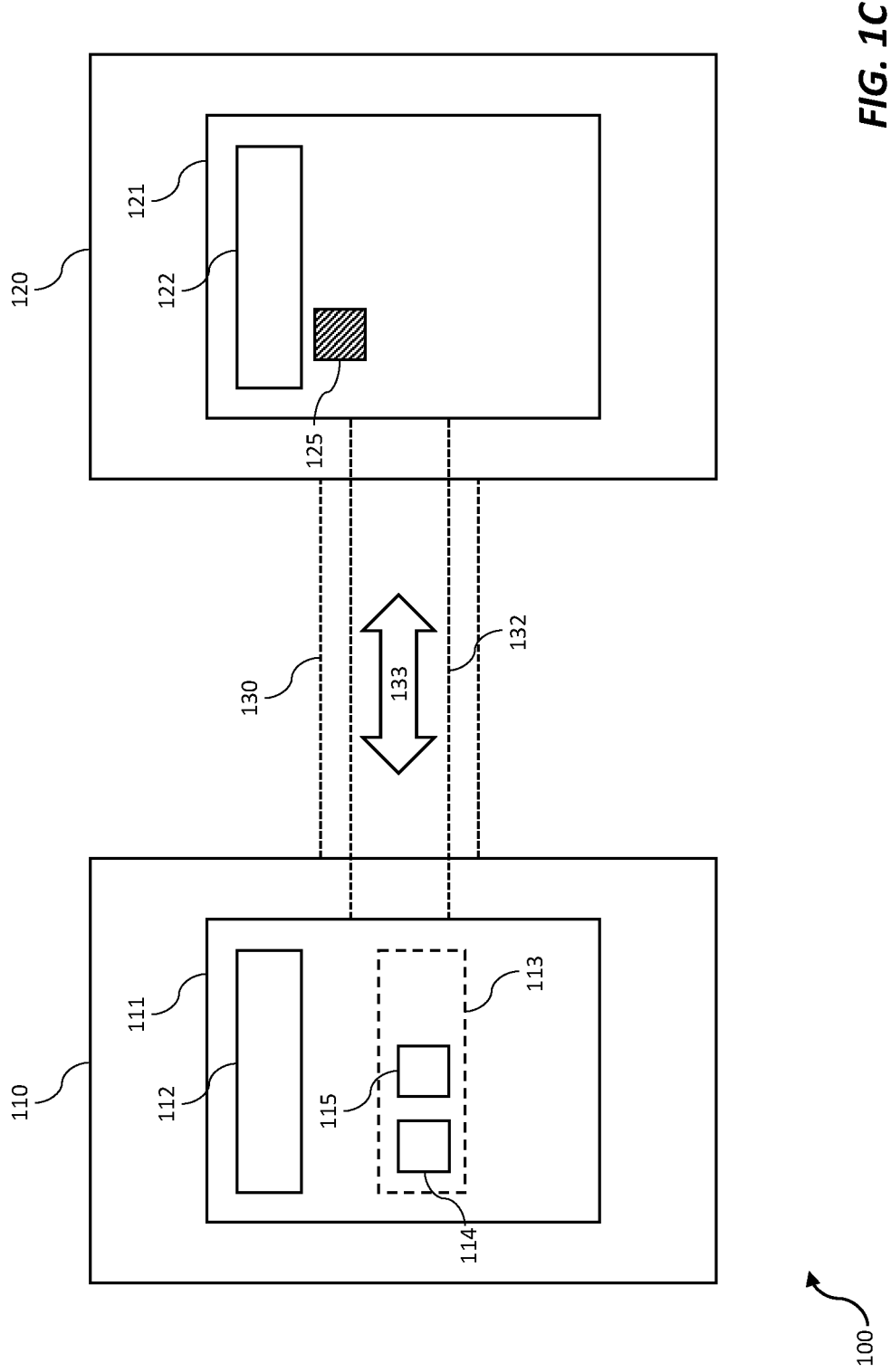

With reference to FIG. 1C, upon receipt of the activation message 131, the secondary application 121 initiates a pairing process to establish an authenticated communications session, denoted schematically as 132, between the primary application 111 and the secondary application 121. In the present embodiment, the authenticated communications session 132 is established using a modified configuration of the Secure Simple Pairing (SSP) protocol, which is a component of the Bluetooth™ standard and based on the well-known Diffie-Hellman key exchange algorithm. In FIG. 1C, the various messages associated with the SSP are denoted collectively as 133 for convenience. It will be appreciated that further embodiments may employ different protocols for the purpose of pairing the primary application 111 and the secondary application 121 to establish an authenticated communications session.

As part of the SSP protocol, a shared secret (hereinafter termed a "link key") is securely established between the primary application 111 and the secondary application 121 and used to authenticate subsequent communications between the primary application 111 and the secondary application 121, as discussed in further detail below. In the present embodiment, the primary application 111 stores the link key in container 113 as authentication data (denoted 115), such that the link key 115 is secured when the container 113 is in a locked state. In contrast, the secondary application 121 is not yet associated with a secure container at this stage of the activation process, so the corresponding runtime process 122 stores the link key in an obfuscated or masked authentication data 125 in the non-volatile memory associated with the secondary computing device 120. Obfuscation of the link key 125 stored by the secondary application 121 ensures that the secondary application 121 can access the link key 125 irrespective of the lock status of the associated secure container (once activated), whilst simultaneously providing a degree of protection from malicious applications which may attempt to obtain the link key 125. For example, the link key 125 may be obfuscated on the basis of one or more characteristics of the secondary device 120 and using a conventional obfuscation techniques such as those provided by the Advanced Encryption Standard (AES) established by the U.S. National Institute of Standards and Technology.

Figure 1D:
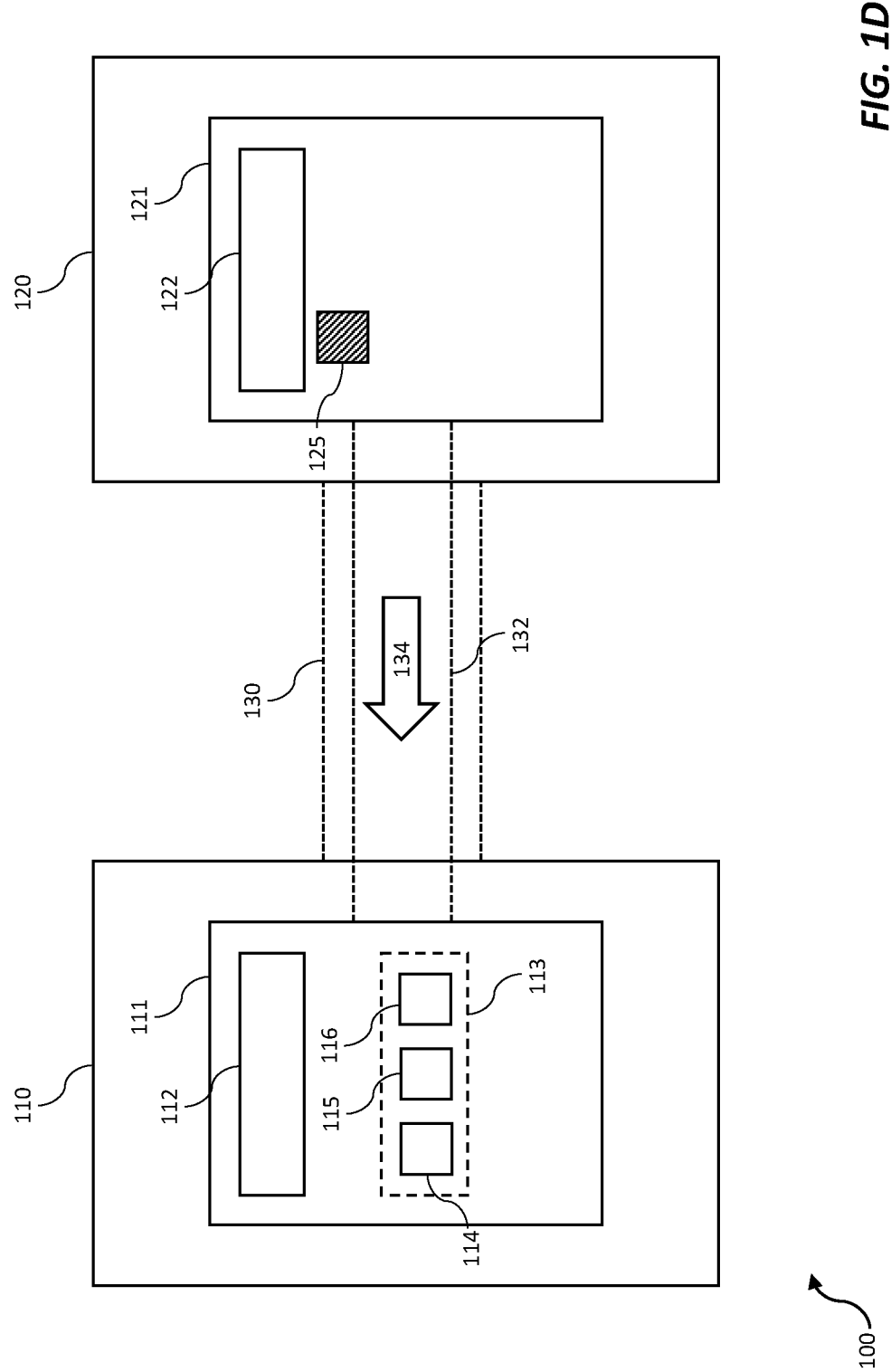

With reference to FIG. 1D, upon completion of the pairing process, the secondary application 121 sends an activation request 134 to the primary application 111. Transmission of the activation request may be performed automatically upon successful pairing of the primary application 111 and the secondary application 121, or may be transmitted in response to user input via the user interface associated with the secondary application 121. Typically, the secondary application 121 signs the activation request 134 using the link key 125 to produce a digital signature which is sent together with the activation request 134 to enable the primary application 111 to authenticate the activation request 134 on the basis of the corresponding link key 115 stored in its respective container 113. Upon authentication of activation request 134, the primary application 111 generates a secondary application secret 116 for the purpose of activating a container for the secondary application 121, and stores the generated application secret 116 in its respective container 113 to prevent unauthorized access to the application secret 116 when the container 113 is in a locked state. In a typical example, the secondary application secret may be generated on the basis of an application identifier and unique information sent to the primary application 111 from the one or more remote management servers discussed above.

Figure 1E:
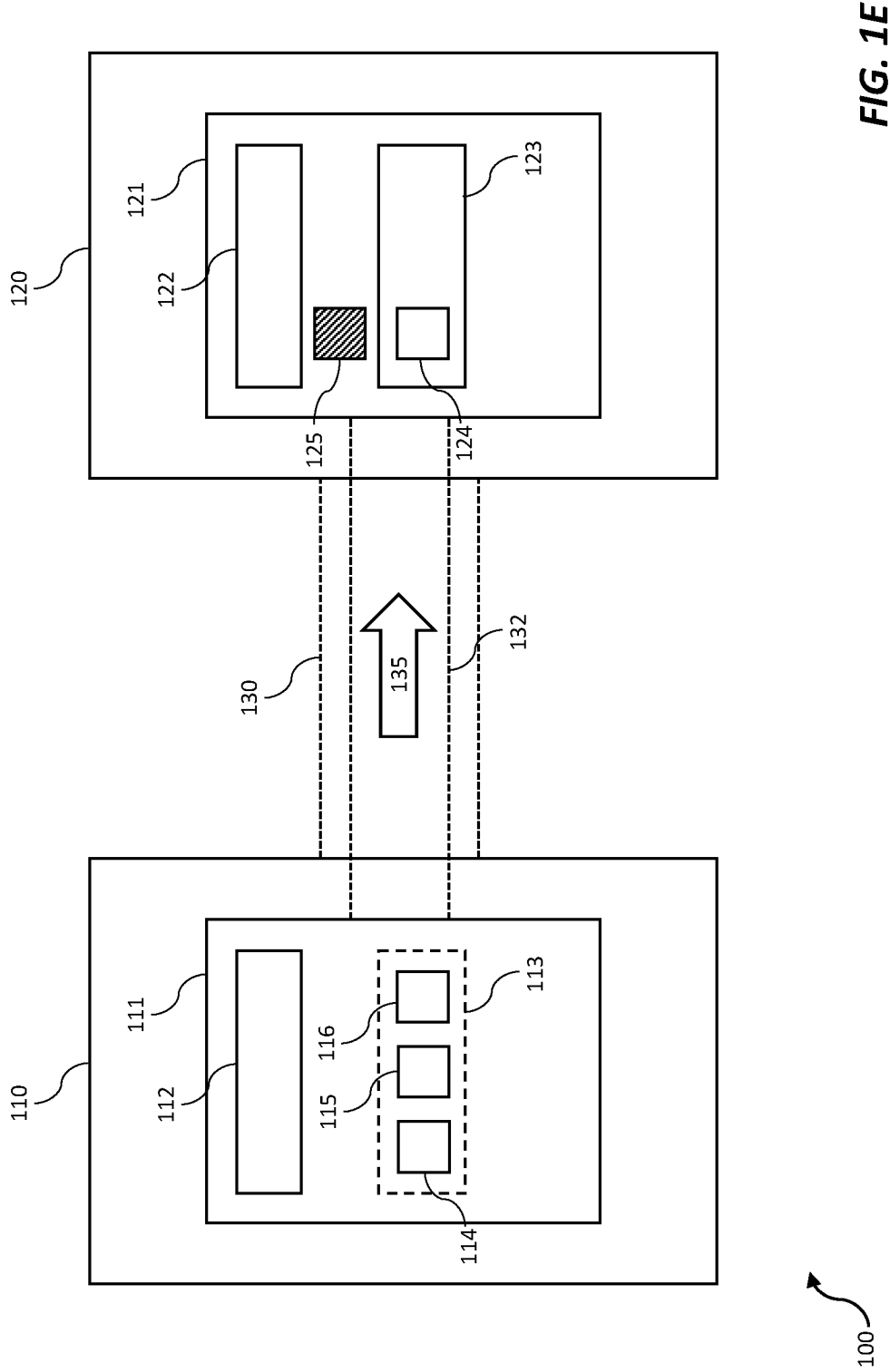

With reference to FIG. 1E, the primary application 111 generates and returns an activation command 135 which includes activation data for activation of a container associated with the secondary application 121. As described above, the activation command 135 may be signed using the link key 115 to generate a signature for authentication by the secondary application 121. Typically, the activation data includes encryption data in the form of the secondary application secret 116 generated by the primary application 111, and may also include policy data 124 to be associated with the container once activated for the secondary application 121. In other embodiments, the policy data 124 to be associated with the container once activated may be sent to the secondary application 121 separately from the activation data.

In some embodiments, the activation data may include configuration data for the purpose of configuring functionality associate with the secondary application 121. For example, the configuration data may include one or more activation keys which enable the secondary application 121 to unlock certain functionality which were disabled when the secondary application was in its inactivated state. In some embodiments, the configuration data may including provisioning data, such as a digital certificate, which enables the secondary application to establish communications with the one or more remote management servers, or any other remote application server. The configuration data may be provided to the primary application 111 by the one or more remote management servers for the purpose of activating the secondary application 121. In this respect, the configuration data may be provided to the primary application 111 prior to receipt of the activation request 134 and stored in its respective secure container 113, or the primary application 111 may send a request for the configuration data to the one or more remote management servers in response to receipt of the activation request 134 from the secondary application 121.

In some embodiments, the activation request 134 and the activation command 135 may be encrypted using a shared secret key established during a Diffie-Hellman key exchange between the primary application 111 and the secondary application 121. In such embodiments, in order to facilitate authentication of the primary application 111 and the secondary application 121, the respective Diffie-Hellman public keys exchanged between the applications may be signed using the shared link key 115, 125 established during the secure pairing algorithm described above with reference to FIG. 1C, and these signatures may be included with the exchanged Diffie-Hellman public keys. In this manner, the trust established during the pairing process for the primary application 111 and the secondary applications 121 can be leveraged to authenticate the activation request 134 and activation command 135 used to activate the container 123 associated with the secondary application 121.

Upon receipt of the activation command 135, the secondary application 121 authenticates the associated signature using the link key 125, extracts the activation data, and activates or creates a secure container 123 using the secondary application secret 116 included in the activation data. In the present embodiment, the runtime process 122 associated with the secondary application 121 generates or derives a secondary container key from the secondary application secret 116 received from the primary application 111 for use in activating a secure container for the secondary application 121. For example, the secondary application may generate the secondary container key on the basis of the application secret 116 using a cryptographic hash algorithm or a hash based message authentication code, such as the HMAC-SHA256 algorithm or similar. Once the container key has been generated, the runtime process 122 for the secondary application 121 encrypts application data associated with the secondary application 121 to create a secure container 123. As discussed above in the context of the primary application 111, the secure container 123 represents an area of secure storage configured in non-volatile memory associated with the secondary computing device 120 and managed by the secondary application 121 for the storage of application data. For example, the application data may be provided to the secondary application 121 by the primary application 111, retrieved from a remote server (e.g. the one or more remote management servers) by the secondary application, generated by the secondary application 121 itself, or provided to the secondary application 121 via the associated user interface.

In some embodiments, the secondary application 121 may receive policy data from the activation command 135 and securely store the policy data 124 in the secure container 123. As discussed above the policy data defines one or more policies which control execution of the secondary application 121. In particular, the policy data 124 may define a policy specifying that the secondary application 121 should be automatically locked and the associated container 123 should be encrypted in the event that the communications link 130 between the primary computing device 110 and the secondary computing device 120 is terminated (e.g. the primary computing device 110 is out of range of the secondary computing device 120). A further policy defined by the policy data 124 may specify whether the secondary application 121 should attempt to automatically authenticate to the primary application 111 once the communications link 130 has been reinstated (e.g. the primary computing device 110 is within range of the secondary computing device 120). In some embodiments, the policy data 124 may specify an inactivity timeout period for the secondary application 121, upon expiry of which the secondary application 121 is configured to automatically lock the associated secure container 123. The policy data 124 may be updated by the primary application 111 periodically or upon each authentication of the secondary application 121. The one or more policies defined by the policy data 124 associated with the secondary application 121 may be set by an administrator and distributed to the primary application 111 by the one or more remote management servers, for subsequent distribution to the secondary application 121.

The secondary application 121 retains the secondary container key derived from the application secret 116 in volatile memory for the period while the secondary application 121 remains unlocked or until the secondary application 121 is terminated or closed (e.g. by the user), at which point the secondary container key is deleted from the volatile memory. Once the container key has been deleted from memory, the secondary 121 application is required to re-authenticate to the primary application 111, e.g. to again receive the secondary application secret 116 and regenerate or re-derive the secondary container key. In this context, the primary application 111 functions as an authenticator application or an "authentication delegate" for the purposes of "authentication delegation" by the secondary application 121.

Figure 1F:
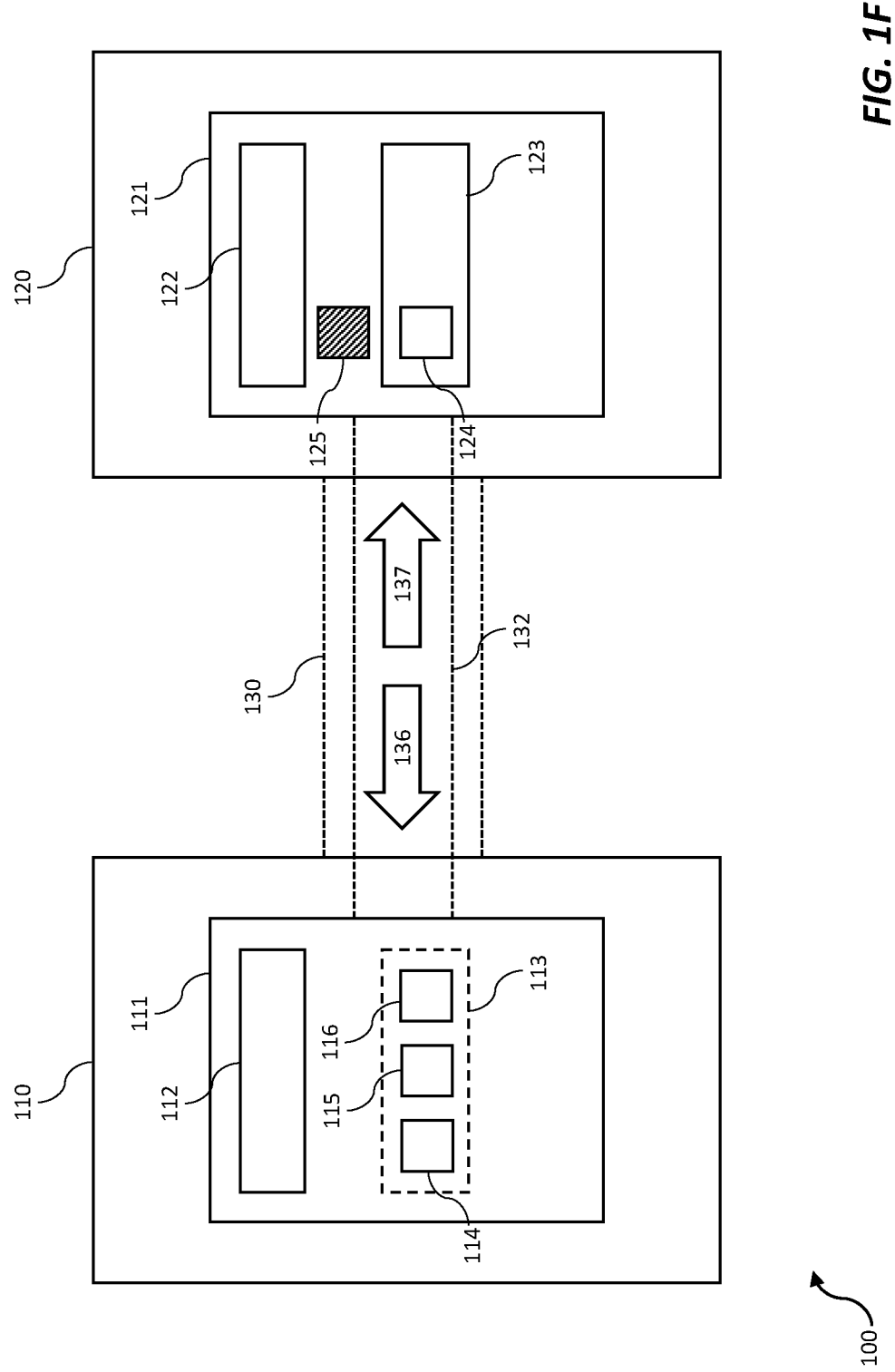

FIG. 1F shows the secondary application 121 in a locked state, such that the associated secure container 123 is encrypted (denoted by solid lines) and the container key is not present in volatile memory. For example, FIG. 1F may represent the state of the secondary application 121 after an inactivity timeout or upon start up following termination by the user. In order to re-authenticate to the primary application 111 and receive the secondary application secret 116 necessary to unlock the secondary container 123, the secondary application 121 sends an unlock request message 136 to the primary application 111. The first application 111 attempts to authenticate the unlock request 136 and, if successful, retrieves the secondary application secret 116 from its respective container 113 and returns the secondary application secret 116 to the secondary application 121 in an unlock response message 137. If the container associated with the primary application 111 is locked (i.e. encrypted) when the unlock request 136 is received from the secondary application 121, the primary application 111 may prompt the user for the primary application secret to authenticate the user prior to unlocking the container 113 and retrieving the secondary application secret 116 for delivery to the secondary application 121. If the user does not provide the primary application secret, both the primary application 111 and the secondary application 121 will remain locked.

Typically, the unlock request 136 and the unlock response 137 may be encrypted using a shared secret key established during a Diffie-Hellman key exchange between the primary application 111 and the secondary application 121. As discussed above in relation to FIGS. 1D and 1E, to facilitate authentication of the primary application 111 and the secondary application 121, the respective Diffie-Hellman public keys exchanged between the applications may be signed using the shared link key 115, 125 established during the secure pairing algorithm described above with reference to FIG. 1C, and these signatures may be included with the exchanged Diffie-Hellman public keys. In this manner, the trust established during the pairing process for the primary application 111 and the secondary application 121 can be leveraged to authenticate the unlock request message 136 and unlock response message 137 used to unlock the container 123 associated with the secondary application 121. In some embodiments, the unlock request 136 and the unlock response 137 may be communicated using an inter-process communication protocol, such as the Inter-Container Communication (ICC) protocol developed by Good Technology Corporation™ of Sunnyvale, Calif., United States of America, aspects of which are disclosed in US patent application publications US 2013/0227279 A1, US 2013/0227287 A1 and US 2013/0227280 A1 which are hereby incorporated by reference.

Figure 1G:
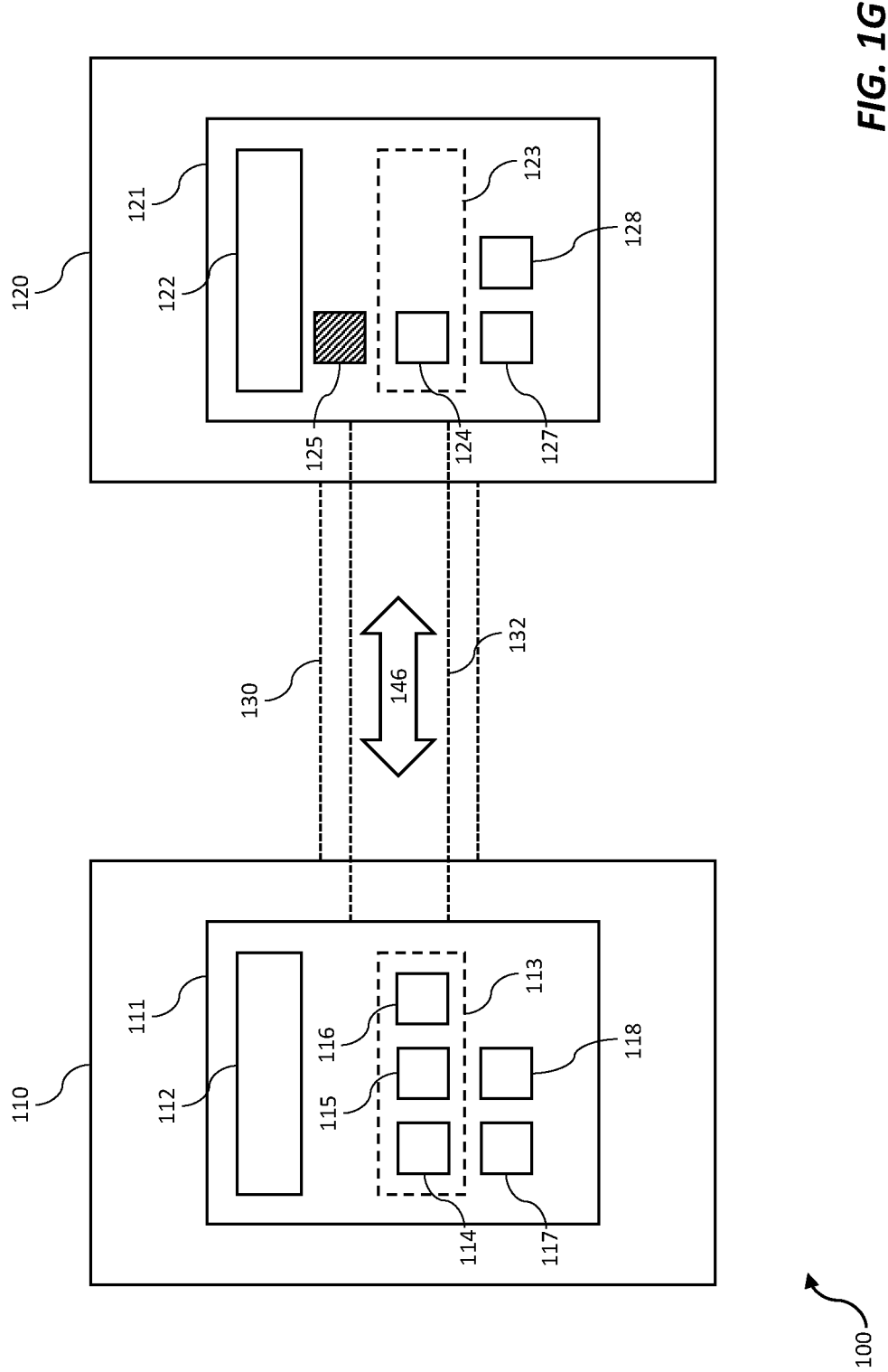

With reference to FIG. 1G, once the container 123 of the secondary application 121 has been unlocked, subsequent communications 146 between the primary application 111 and the secondary application 121 are secured on the basis of the shared private key derived from the Diffie-Hellman exchange associated with the authentication delegation described above with reference to FIG. 1F. In this context, the shared private key derived from the Diffie-Hellman exchange functions as a session key for communication between the primary application 111 and the secondary application 121 for the period during which the secondary application 121 is unlocked. In order to provide independent encryption, dependent on the direction of communication, the primary application 111 and the secondary application 121 each derives a pair of keys (hereinafter termed "communication keys") on the basis of the session key, a device identifier, and a direction Tx/Rx identifier. For example, the communication keys may be generated using a cryptographic hash algorithm or a hash based message authentication code, such as HMAC-SHA256 algorithm or similar. In a further example, both the primary application 111 and the secondary application 121 may separately and independently derive the communication keys on the basis of the public keys generated and exchanged as part of the Diffie-Hellman key exchange. Once generated, copies of the communication keys are stored in volatile memory associated with the respective primary application 111 (denoted 117, 118) and the secondary application 121 (denoted 127, 128) and are used to encrypt and decrypt data transmitted between the primary application 111 and the secondary application 121 for the period during which the secondary application remains unlocked.

Figure 2:
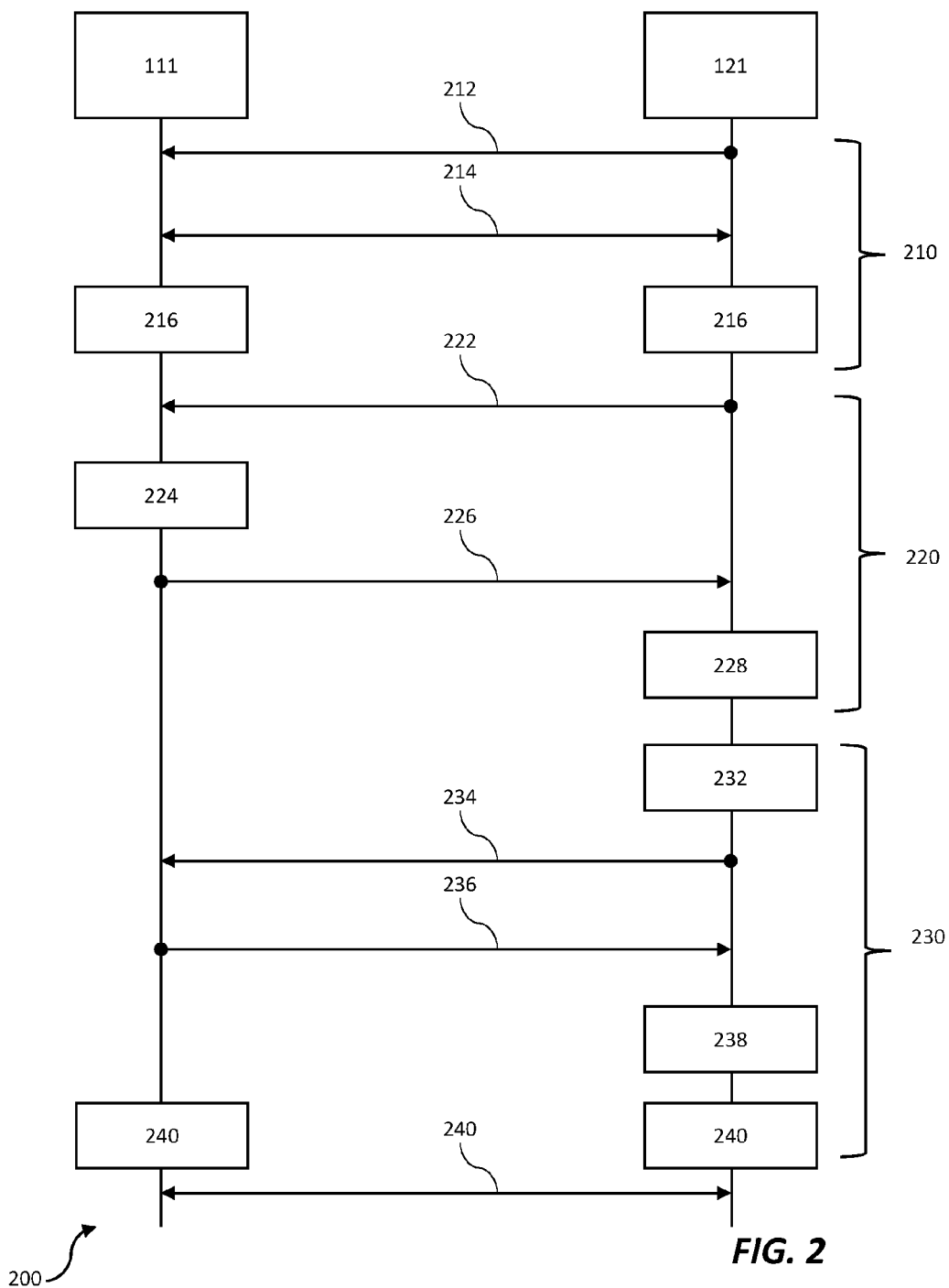
FIG. 2 is a signaling diagram showing a method for configuring a container associated with the secondary application in accordance with an embodiment.

FIG. 2 is a signaling diagram representative of a method 200 of activating and managing secure storage associated with the secondary application 121, in accordance with an embodiment. The method 200 of FIG. 2 includes three stages: (i) a pairing stage 210; (ii) an activation stage 220; and (iii) a management stage 230. With regard to the pairing stage 210, the secondary application 121 sends an activation request to the primary application 111 via the communications link 130 established between the primary computing device 110 and the secondary computing device 120 (step 212). Upon receipt of the activation request, the primary application 111 initiates a pairing process with the secondary application 121 to establish an authenticated communications session 132 (step 214). As discussed above, the pairing process at step 214 may be based on the SSP protocol, such that minimal or no user input is required to establish the authenticated communications session 132. For example, the SSP protocol may operate on the basis of a "numeric comparison", whereby the only user interaction required is confirmation that the code displayed on, or audible tone emitted by, each device matches. It will be apparent to that the pairing process may be tailored to the capabilities of the primary computing device 110 and the secondary device 120, and the security requirements of the entity administrating the primary application 111 and the secondary application 121. Moreover, parameters associated with the pairing process, such as security level, may be specified by one or more policies defined by the policy data 114 stored by the primary application 111. Once the pairing process is complete, the primary application 111 and the secondary application 121 store authentication data, in the form of the link key 115, 125 for authentication of subsequent communications between the applications (step 216). As discussed above with reference to FIG. 1C, the primary application 111 may store the link key 115 in its respective secure container 113, whereas the secondary application 121 may store the link key 125 in an obfuscated format in non-volatile memory associated with the secondary computing device 120.

Upon completion of the pairing stage 210, the secondary application 121 initiates the activation stage 220 by sending an activation request 134 to the primary application 111 (step 222). As discussed above, the activation request 134 may be signed by the link key 125 stored by the secondary application 121 such that the activation request 134 can be authenticated by the primary application 111. Upon receipt, the primary application 111 authenticates the activation request on the basis of its accompanying signature and the stored link key 115, checks the one or more policies defined by the policy data 114 to confirm that activation of the secondary application 121 is permitted, and proceeds to generate a secondary application secret 116 in the manner discussed above with reference to FIG. 1D (step 224). Once generated, the primary application 111 sends an activation command, including the secondary application secret 116 and any relevant policy data and/or configuration data, to the secondary application 121 (step 226). Again, as discussed above, the primary application 111 may sign the activation command using the link key 115 such that the activation command may be authenticated by the secondary application 121 using its link key 125 upon receipt. Upon receipt of the activation command, the secondary application 121 extracts the secondary application secret 116, derives the secondary container key in the manner discussed above, and proceeds to activate a secure container for the secondary application 121 by encrypting application data using the secondary container key (step 228).

Once the secure container 123 associated with the secondary application 121 has been activated in the activation stage 220, the secondary application 121 proceeds to manage the secure container 123 in accordance with any policies defined in its associated policy data 124. For example, the secondary application 121 may proceed to lock its secure container in response to timeout of an inactivity timer or a similar lock event (step 232). Thereafter, in order to unlock the secure container 123, the secondary application 121 generates an unlock request and sends the unlock request to the primary application 111 (step 234). As discussed above with reference to FIG. 1F, the lock request may be encrypted according to a Diffie-Hellman key exchange and signed using the link key 125 generated in the initial pairing process 210 to enable authentication. In response to the unlock request, the primary application 111 retrieves the secondary application secret 116 from its secure container 113 and generates and returns an unlock command in the manner discussed above with reference to FIG. 1F (step 236). If the secure container 113 associated with the primary application 111 is locked when the unlock command is received by the primary application 111, the primary application 111 may prompt the user to input the primary application secret such that the secure container 113 can be unlocked and the secondary application secret 116 can be retrieved. Upon receipt of the lock command, the secondary application 121 extracts the secondary application secret, derives the secondary container key, and decrypts the secure container 123 in the manner discussed above with reference to FIG. 1F (step 238). Once unlocked, the primary application 111 and the secondary application 121 generate the communication keys 117, 118, 127, 128 for use in securing communications between the respective applications for during the period while the container 123 associated with the secondary application 121 remains unlocked (step 240).

Figure 3:
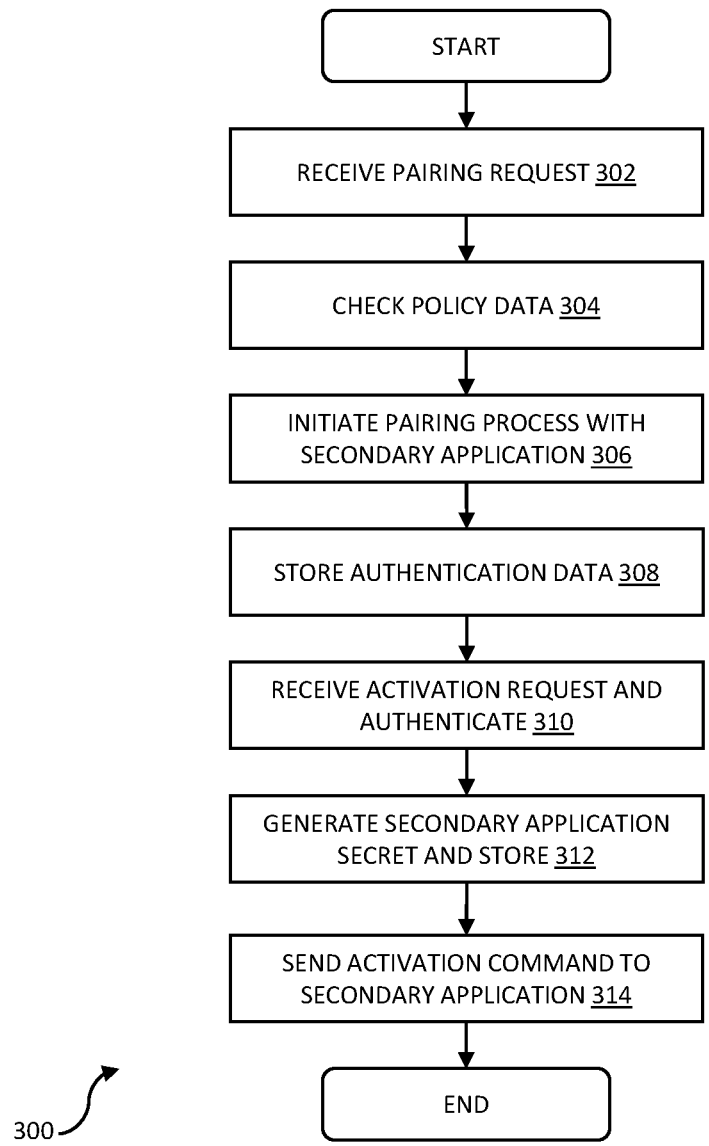
FIG. 3 is a flow diagram showing a method performed by the primary application for configuring the container associated with the secondary application in accordance with an embodiment.

FIG. 3 is a flow diagram showing a method 300 of activating secure storage associated with the secondary application 121 from the perspective of the primary application 111, in accordance with an embodiment. In general terms, the method 300 corresponds to the pairing stage 210 and the activation stage 220 of the method 200 described above with reference to FIG. 2. First, the primary application 111 receives a pairing request in respect of the secondary application 121 (step 302) and checks whether pairing with the secondary application 121 is permitted, based on one or more policies defined by the respective policy data 114 (step 304). If the policy data 114 permits pairing of the primary application 111 and the secondary application 121, the primary application 111 initiates the pairing process in the manner described above with reference to FIG. 1C and steps 214 of FIG. 2 to establish an authenticated communications session 132 between the primary application 111 and the secondary application 121 (step 306). As part of the pairing process, the primary application 111 stores authentication data in the form of link key 115 for use in authenticating subsequent communications with the secondary application 121 (step 308). Next, the primary application 111 receives an activation request 134 from the secondary application 121 and authenticates the activation request 134 using the stored link key 115 (step 310). Once the activation request 134 has been authenticated, the primary application 111 proceeds to generate and stores the secondary application secret 116 as discussed above with reference to FIG. 1E and step 224 of FIG. 2 (step 312). Next, the primary application 111 generates an activation command 135, including the secondary application secret and signed using the link key 115, and returns the activation command 135 to the secondary application 121 (step 314).

Figure 4:
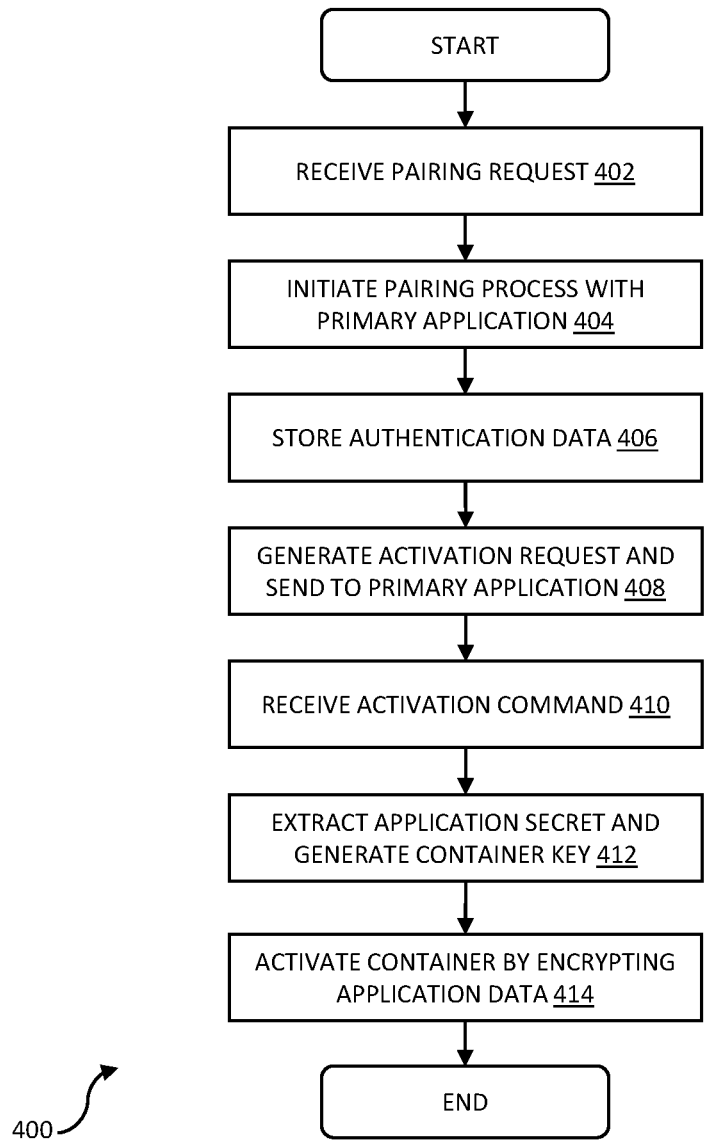
FIG. 4 is a flow diagram showing a method performed by the secondary application for configuring the container associated with the secondary application in accordance with an embodiment.

FIG. 4 is a flow diagram showing a method 400 of activating secure storage associated with the secondary application 121 from the perspective of the secondary application 121, in accordance with an embodiment. First, the secondary application 121 receives a pairing request in respect of the primary application 111 (step 402) and proceeds to initiate the pairing process in the manner described above with reference to FIG. 1C and step 214 of FIG. 2 to establish an authenticated communications session 132 between the primary application 111 and the secondary application 121 (step 404). As part of the pairing process, the secondary application 121 stores authentication data in the form of link key 125 for use in authenticating subsequent communications with the secondary application 121 (step 406). As discussed above with reference to FIG. 1C and step 216 of FIG. 2, the link key 125 may be stored in an obfuscated format to mitigate against unauthorized use by a malicious third party. Next, the secondary application 121 generates an activation request 134, signs the activation request 134 using the link key 125, and sends the signed activation 134 request to the primary application 111 (step 408). If activation of the secondary application 121 is permitted by the one or more policies defined by the policy data 114 stored by the primary application 111, the secondary application 121 subsequently receives an activation command 135 from the primary application 111 (step 410). Next, the secondary application 121 authenticates the activation command 135 using its stored link key 125 and extracts the secondary application secret together with any relevant policy data and/or configuration data. Next, based on the extracted secondary application secret, the secondary application 121 derives the secondary container key in the manner discussed above with reference to FIG. 1E and step 228 of FIG. 2 (step 412). Once the secondary container key has been derived, the secondary application 121 proceeds to activate a secure container for the secondary application 121 by encrypting application data associated with the secondary application 121 using the secondary container key (step 414). In a similar manner, the secondary application 121 may activate one or more functionalities based on the configuration data extracted from the activation command 135. It will be further appreciated that the configuration data and/or the policy data 124 may be received by the secondary application 121 in one or more further messages, subsequent to the initial activation command 135 received from the primary application 121.

Figure 5:
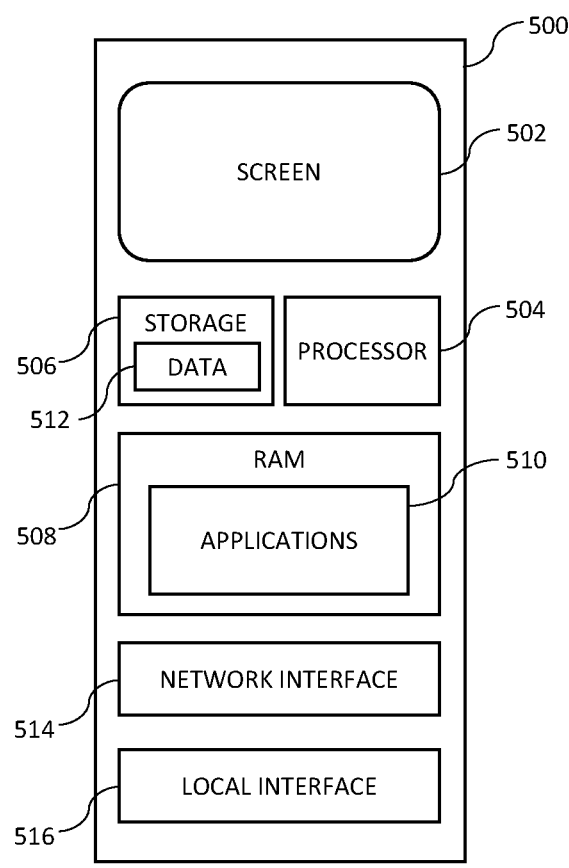
FIG. 5 is a schematic diagram showing a computing device in accordance with an embodiment.

In one application, the primary computing device 110 and/or the secondary computing device 120 takes the form of a portable computing device. An example of a portable computing device according to an embodiment is shown schematically in FIG. 5. The portable computing device 500 may, for example, take the form of a cellular phone, a smart phone, a personal digital assistance (PDA), a tablet computer, a wearable computing device, a notebook computer, or the like. Moreover, the portable computing device 500 may be a "smart" household appliance, such as a fridge, a lighting system, a music system, a television or any other electronic device requiring configuration of secure storage. The portable computing device 500 includes a screen 502, which may be a touch screen for receipt of input from a user. Alternatively or additionally, the portable computing device 500 may include a physical keyboard (not shown), which may be integral to the portable computing device 500 or connected wirelessly or by wired connection to the portable computing device 500. The computing device further includes a processor 504, a non-volatile storage component 506 (such as a hard disk drive or a solid-state drive) and a volatile storage component in the form of random access memory (RAM) 508. The processor executes instructions stored in the random access memory 508 that have been loaded from the non-volatile storage device 506. These instructions are in the form of one or more programs that implement an operating system (not shown) and a secure application 510, such as the primary application 111 described above with reference to FIGS. 1 to 4. The random access memory 508 is also used by programs running on the processor 504 as a means of storing and accessing data in the form of electronic signals where the data is used during the execution of the programs. The non-volatile storage component 506 can store data 512. The operating system provides a file system for storing, modifying and accessing files held in the non-volatile storage device 506, such as the secure container 113 associated with the primary application 111. The file system may be accessible to other programs running on the processor 504 via the operating system. Programs running on the processor 504 also process user input obtained via the screen 502 or keyboard (not shown), etc. The portable computing device 500 also includes a network interface 514 (or a plurality of network interfaces) which allows programs running on the processor 504 to transmit and receive data to and from other devices and/or servers via a communications, using wired and/or wireless connections. Typically, the network interface 514 is implemented in a combination of software and hardware (e.g. a network interface controller) to provide the necessary network connectivity to the programs running on the processor 504. Examples of network interface 214 include a Wi-Fi™ interface and/or a cellular radio utilizing standards such as Global System for Mobile Communications (GSM), Universal Mobile Telecommunications System (UMTS), Code Division Multiple Access (CDMA), Long Term Evolution (LTE), or the like. The portable computing device 500 may also include a local communications interface 516, such as a Bluetooth™ interface or an NFC™ interface. The local communications interface 516 may also be implemented in a combination of software and hardware and provide connectivity to one or more further computing devices in the local vicinity of the portable computing device 500. For example, the local communications interface may be utilized by the portable computing device 500 to establish the communications link 130 described above with reference to FIG. 1A.

In some applications, the secondary computing device 120 may also take the form of a portable computing device in a similar manner to the primary computing device 110. Thus, the secondary computing device may also take the form of a cellular phone, a smart phone, a personal digital assistance (PDA), a tablet computer, a wearable computing device, a notebook computer, or the like. Moreover, the secondary computing device 120 may be a "smart" household appliance, such as a fridge, a lighting system, a music system, a television or any other electronic device requiring configuration of secure storage. In this context, the secondary computing device 120 have the same functionality as the portable computing device 500 shown in FIG. 4 or a subset of that functionality. For example, in some embodiments the secondary computing device may lack the network connectivity provided by network interface 514 and thus be unable to initiate a communications link to the one or more remote management servers discussed above with reference to FIG. 1A.

In a typical example, the primary application 111 may be a secure email client, in which case the associated runtime process 112 may provide functionality for viewing, editing, creating and sending email messages. The secondary application 121 may be an email notification application configured to cooperate with the primary application 111 to provide the user with notifications relating to email events, such as receipt of emails and the like. In this context, the embodiments described above provide for secure activation of the secondary application 121 such that application data, such as email content, can be stored in secure storage associated with the secondary device. In further examples, the second application 121 may provide a user with additional functionality for the manipulating and responding to emails and thus it is desirable that the associated email content can be securely stored by the secondary application 121. In this manner, secure activation of the secondary application 121 ensures that an enterprise and can maintain control over sensitive and/or commercially content which may be distributed by email.

As discussed above, activation of the secondary application 121 may be initiated by unlocking the primary application 111. In further embodiments, the activation process may be initiated by the secondary application 121. For example, upon installation the secondary application 121 may be configured to automatically search for a suitable primary application 111 running on the primary computing device 110. Alternatively or additionally, the user may prompt the secondary application 121 to initiate the activation process via a user interface associated with secondary application 121.

According to some embodiments, the primary device 110 and the secondary device 120 may be associated with respective primary and secondary users. In this scenario, embodiments of the invention enable the primary user to control the secondary user's access to information provided to the secondary device 120 by the primary device 110 and stored in the secure container 123 of the secondary application 121 (i.e. the "application data" described above in relation to FIGS. 1A to G). According to such embodiments, the secondary user is only permitted to access the information when the secondary application 121 is able to receive the secondary application secret 116 from the primary application 111. Thus, by controlling provision of the secondary application secret 116 to the secondary application 121, the primary application 111 can control the secondary user's access to the information stored in the secure container 123 of the secondary application 121.

It will be appreciated that at least parts of the methods discussed above with reference to FIGS. 1 to 4 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

The above embodiments are to be understood as illustrative examples and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method for configuring secure storage on a computing device, the computer implemented method comprising:
storing, at a first application running on a first computing device, authentication data associated with an authenticated communications session conducted between the first application on the first computing device and a second application running on a second computing device different from the first computing device, wherein the first application is configured to disable functionality associated with the first application;
receiving, at the first application without access to a secure storage in non-volatile memory on the first computing device, an activation command comprising encryption data from the second application;
authenticating, by the first application, the activation command based on the authentication data stored at the first application running on the first computing device;
in response to the activation command authenticated based on the authentication data stored at the first application running on the first computing device, configuring, by the first application, the secure storage in the non-volatile memory on the first computing device based at least in part on the activation command received from the second application, configuring the secure storage in the non-volatile memory on the first computing device comprising activating the secure storage in the non-volatile memory on the first computing device, the activating of the secure storage in the non-volatile memory on the first computing device comprising encrypting application data associated with execution of the first application based on the encryption data from the second application;
in response to the configuring of the secure storage in the non-volatile memory on the first computing device, enabling disabled functionality associated with the first application, the enabling comprising verifying an activation key received from the second application; and
in response to activating the secure storage in the non-volatile memory on the first computing device, by the first application, managing the secure storage, wherein managing the secure storage comprise locking or unlocking the secure storage to control accessibility of the application data associated with execution of the first application by a runtime process running on the first computing device.

2. A computer-implemented method according to claim 1, comprising generating, by the first application, an encryption key based on the encryption data, wherein encryption of the application data is based on the encryption key.

3. A computer-implemented method according to claim 1, wherein the activation command further includes policy data indicative of one or more data access policies associated with the application data.

4. A computer-implemented method according to claim 3, comprising the first application controlling access to encrypted application data based on the one or more data access policies indicated by the policy data.

5. A computer-implemented method according to claim 3, wherein the policy data is generated at a management server remote from the first application and the second application.

6. A computer-implemented method according to claim 3, wherein configuring the secure storage in the non-volatile memory on the first computing device comprises encrypting the policy data based on the encryption data.

7. A computer-implemented method according to claim 3, wherein the authentication data is generated in a secure pairing process initiated between the first application and the second application.

8. A computer-implemented method according to claim 7, wherein the secure pairing process is based on a Diffie-Hellman key exchange.

9. A computer-implemented method according to claim 7, wherein the secure pairing process is based on a Simple Secure Pairing algorithm.

10. A computer-implemented method according to claim 7, wherein the secure pairing process is performed via a communications link established between the first computing device and the second computing device.

11. A computer-implemented method according to claim 10, wherein at least part of the communications link comprises a wireless communications link.

12. A computer-implemented method according to claim 1, wherein the authentication data is indicative of a cryptographic key shared between the first application and the second application.

13. A computer-implemented method according to claim 1, comprising:
sending, by the first application, an unlock request based on the authentication data;
receiving, at the first application, an unlock response comprising decryption data from the second application;
authenticating, at the first application, the unlock response based on the authentication data; and
decrypting, at the first application, the application data based on the decryption data received from the second application.

14. A computer-implemented method according to claim 13, comprising generating a decryption key based on the decryption data, wherein decryption of the application data is based on the decryption key.

15. A computer-implemented method according to claim 13, wherein the decryption data is the same as the encryption data.

16. A computer-implemented method according to claim 1, wherein enabling the disabled functionality comprises verifying presence of the secure storage in the non-volatile memory on the first computing device.

17. A computer-implemented method for configuring secure storage on a computing device, the method comprising:
storing, at a first application running on a first computing device, authentication data associated with an authenticated communications session initiated between the first application on the first computing device and a second application running on a second computing device different from the first computing device, wherein the second application is configured to disable functionality associated with the second application;
receiving, from a remote server, policy data indicative of one or more data access policies associated with application data stored in a secure storage associated with the second application in non-volatile memory on the second computing device;
generating, at the first application, encryption data for the second application in response to receipt of an activation request from the second application;
generating, at the first application, an activation command comprising the encryption data and the policy data;
signing, by the first application, the activation command using the authentication data;
sending the activation command from the first application to the second application, wherein the activation command is configured to activate and configure the secure storage associated with the second application in the non-volatile memory on the second computing device based on the encryption data included in the activation command from the first application; and
sending an activation key from the first application to the second application, wherein the second application is configured to enable disabled functionality by verifying the activation key and in response to activating and configuring the secure storage associated with the second application in the non-volatile memory on the second computing device based on the encryption data included in the activation command from the first application;
in response to activating and configuring the secure storage associated with the second application in the non-volatile memory on the second computing device managing the secure storage by the second application, wherein managing the secure storage comprises locking and unlocking the secure storage to control accessibility of the application data associated with executing of the second application by a runtime process running on the second computing device.

18. A non-transitory computer-readable storage medium comprising computer-executable instructions which, when executed by a processor, cause a computing device to perform steps to configure a secure storage on the computing device, the steps comprising:
storing, at a first application running on a first computing device, authentication data associated with an authenticated communications session conducted between the first application on the first computing device and a second application running on a second computing device different from the first computing device, wherein the first application is configured to disable functionality associated with the first application;
receiving, at the first application without access to a secure storage in non-volatile memory on the first computing device, an activation command comprising encryption data from the second application;
authenticating, by the first application, the activation command based on the authentication data stored at the first application running on the first computing device;
in response to the activation command authenticated based on the authentication data stored at the first application running on the first computing device, configuring, by the first application, the secure storage in the non-volatile memory on the first computing device based at least in part on the activation command received from the second application, the configuring the secure storage in the non-volatile memory on the first computing device comprising activating the secure storage in the non-volatile memory on the first computing device, the activating comprising encrypting application data associated with execution of the first application based on the encryption data from the second application;
in response to configuring the secure storage in the non-volatile memory on the first computing device, enabling disabled functionality associated with the first application, the enabling comprising verifying an activation key received from the second application; and in response to activating the secure storage in the non-volatile memory on the first computing device, by the first application, managing the secure storage, wherein managing the secure storage comprise locking or unlocking the secure storage to control accessibility of the application data associated with execution of the first application by a runtime process running on the first computing device.

\* \* \* \* \*